(12) United States Patent
Shazeer

(10) Patent No.: US 10,796,225 B2
(45) Date of Patent: Oct. 6, 2020

(54) DISTRIBUTING TENSOR COMPUTATIONS ACROSS COMPUTING DEVICES

(71) Applicant: Google LLC, Mountain View, CA (US)

(72) Inventor: Noam M. Shazeer, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/532,381

(22) Filed: Aug. 5, 2019

(65) Prior Publication Data

US 2020/0042875 A1 Feb. 6, 2020

Related U.S. Application Data

(60) Provisional application No. 62/714,586, filed on Aug. 3, 2018.

(51) Int. Cl.

| | |
|---|---|
| *G06F 15/18* | (2006.01) |
| *G06N 3/08* | (2006.01) |
| *G06N 3/04* | (2006.01) |
| *G06F 16/901* | (2019.01) |
| *G06K 9/62* | (2006.01) |
| *G06F 17/11* | (2006.01) |

(52) U.S. Cl.
CPC .......... *G06N 3/08* (2013.01); *G06F 16/9024* (2019.01); *G06K 9/6256* (2013.01); *G06N 3/04* (2013.01); *G06F 17/11* (2013.01)

(58) Field of Classification Search
CPC .......... G06N 3/08–088; G06F 16/9024; G06F 9/5061; G06F 9/5066; G06F 8/451–453
USPC ............... 706/12–62; 717/149–150; 718/104
See application file for complete search history.

(56) References Cited

U.S. PATENT DOCUMENTS

2015/0169369 A1* 6/2015 Baskaran .............. G06F 9/4881
718/102

OTHER PUBLICATIONS

Almeida et al. "Distributed Large-Scale Tensor Decomposition", 2014, 2014 IEEE International Conference on Acoustic, Speech and Signal Processing.*
Kivelä et al. "Multilayer Networks", 2014, Journal of Complex Networks.*
Abadi et al. "TensorFlow: Large-Scale Machine Learning on Heterogeneous Distributed Systems", 2015, white paper.*

(Continued)

*Primary Examiner* — Jue Louie
(74) *Attorney, Agent, or Firm* — Fish & Richardson P.C.

(57) ABSTRACT

Methods, systems, and apparatus, including computer programs encoded on computer storage media, for distributing tensor computations across computing devices. One of the methods includes: receiving specification data that specifies a distribution of tensor computations among a plurality of computing devices, wherein each tensor computation (i) is defined to receive, as input, one or more respective input tensors each having one or more respective input dimensions, (ii) is defined to generate, as output, one or more respective output tensors each having one or more respective output dimensions, or both, wherein the specification data specifies a respective layout for each input and output tensor that assigns each dimension of the input or output tensor to one or more of the plurality of computing devices; assigning, based on the layouts for the input and output tensors, respective device-local operations to each of the computing devices; and causing the tensor computations to be executed.

20 Claims, 6 Drawing Sheets

(56) References Cited

OTHER PUBLICATIONS

Oguz Kaya "High Performance Parallel Algorithms for Tensor Decompositions", 2017, Université de Lyon.*
Gholami et al., "Integrated Model, Batch and Domain Parallelism in Training Neural Networks," Arxiv.org, Cornell University Library, Dec. 2017, 1-9.
Laugier et al., "Integrated model and data parallelism for training deep neural networks," May 2018, URL <https://leolaugier.github.io/doc/parallel.pdf, 9 pages.
PCT International Search Report and Written Opinion in International Appln. No. PCT/US2019/045167, dated Oct. 25, 2019, 18 pages.
Wang et al., "Unifying Data, Model and Hybrid Parallelism in Deep Learning via Tensor Tiling," Arxiv.org, Cornell University Library, May 2018, 8 pages.
Chelba et al, "One billion word benchmark for measuring progress in statistical language modeling" arXiv, Mar. 2014, 6 pages.
Jain et al, "Y.: Optimal bucket algorithms for large MPI collectives on torus interconnects" Proceedings of the 24th ACM International Conference on Supercomputing, Jun. 2010, 10 pages.
Jin et al, "Spatially Parallel Convolutions" ICLR, 2018, 4 pages.
Józefowicz et al, "Exploring the Limits of Language Modeling" arXiv, Feb. 2016, 11 pages.
Patarasuk et al, "Bandwidth optimal all-reduce algorithms for clusters of workstations" Florida State University, Feb. 2009, 24 pages.
Shazeer et al, "Outrageously Large Neural Networks: The Sparsely-Gated Mixture-of-Experts Layer" arXiv, Jan. 2017, 19 pages.
Vaswani et al, "Attention Is All You Need" arXiv, Dec. 2017, 15 pages.

* cited by examiner

DISTRIBUTING TENSOR COMPUTATIONS ACROSS COMPUTING DEVICES

CROSS-REFERENCE TO RELATED APPLICATION

This application claims the benefit under 35 U.S.C. § 119(e) of the filing date of U.S. Patent Application No. 62/714,586, for DISTRIBUTING TENSOR COMPUTATIONS ACROSS COMPUTING DEVICES, which was filed on Aug. 3, 2018, and which is incorporated here by reference.

BACKGROUND

This specification relates to distributing tensor computations across multiple computing devices for execution. For example, the tensor computations can be operations for training a neural network or other machine learning model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that distributes tensor computations across computing devices in response to received requests. Tensor computations receive, as input, one or more input tensors reach having one or more respective input dimensions. In addition or alternatively, tensor computations can be defined to generate, as output, one or more output tensors each having one or more respective output dimensions. In this specification, a tensor computation that receives or generates a tensor means that a computing device configured to execute the tensor computation executes the tensor computation to receive one or more input tensors, generates one or more output tensors, or both, depending on the definition of the tensor computation.

Each computing device includes at least one processor and memory for storing tensors. The computing devices can include processor cores, processors, microprocessors, special-purpose logic circuitry, e.g., an FPGA (field-programmable gate array) or an ASIC (application-specific integrated circuit), or any other appropriate computing devices. In some examples, the computing devices are all the same type of computing device. In other examples, the computing devices can include different types of processing units. For example, one device can include one or more CPUs (central processing units) while other devices can include one or more GPUs (graphics processing units) or TPUs (tensor processing units).

For example, the tensor computations can be operations for training a neural network or other kind of machine learning model or operations for using a neural network or other machine learning model to perform inference.

In particular, the system allows users to submit specification data that specifies the layout of the tensors involved in the tensor computations, i.e., how each dimension of each tensor involved in the tensor computations should be distributed across the computing devices. For example, a user can submit specification data that specifies, for each dimension of each tensor, whether the dimension should be split among at least some of the devices or should be replicated across all of the devices.

Based on the layouts, the system compiles the tensor computations into device-local operations and, if necessary, communication primitive operations that cause communication between devices to combine outputs of the device-local operations.

The system can then cause the tensor computations to be executed by causing each device to execute the corresponding device-local operations (and, if necessary, the communication primitive operations) on inputs received by the device. The system can cause a device to execute a corresponding device-local operation in any of a variety of ways, e.g., by sending appropriate instructions or control signals to the device that cause it to execute each device-local operation assigned to the device when the inputs to the device-local operation become available.

When the tensor computations are operations for training a machine learning model, the user can specify the layout for each tensor that is processed, i.e., received or generated, during an iteration of a machine learning training procedure performed for a batch of training data. The system can then cause the tensor computations to be executed repeatedly on different batches of training data to repeatedly update the parameters of the machine learning model in order to train the model to convergence or until some other criteria are satisfied.

Particular embodiments of the subject matter described in this specification can be implemented so as to realize one or more of the following advantages.

By allowing users to specify how to distribute tensor computations solely by specifying the layout of the relevant tensors, complex distribution schemes can be specified in a simple manner. Thus, effective distribution schemes that cause the tensor computations, e.g., model training operations, to be performed in ways that result in one or more of high utilization of the computational capacity of devices, increased performance, or reduced computation time can effectively be implemented by users.

Using the methods described herein for specifying distribution schemes may more effectively utilize the computational capacity of computing devices by minimizing the communication between the computing devices, e.g. by leveraging existing physical connections between computing devices in the mesh. Communication between computing devices is typically more expensive than computation and is usually the bottleneck in a parallel program, especially in distributed settings. Methods described herein can express more fine-grained parallelism than other parallelization strategies, such as for example owner-compute strategies.

Using the techniques described in this specification for specifying distribution schemes, schemes for parallelizing the training of very large machine learning models, i.e., models that do not fit on a single computing device, can be specified and implemented. This allows models to be trained that achieve improved performance on any of a variety of machine learning tasks relative to the state of the art, e.g., because models can be effectively trained that have more parameters (e.g., more hidden units) than conventional models. Additionally, models that process very large inputs can also be effectively implemented, both for training and inference, by making use of the computational capacity of all of the available devices. At inference, the system can execute a model with lower latency over conventional approaches, because operations are distributed across the computing devices.

Additionally, by specifying distribution schemes in the manner described in this specification, a given distribution scheme can be easily generalized to work with other hardware or model types. Thus, once an effective distribution scheme is discovered, the scheme can easily be generalized to effectively distribute other similar tensor computations.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
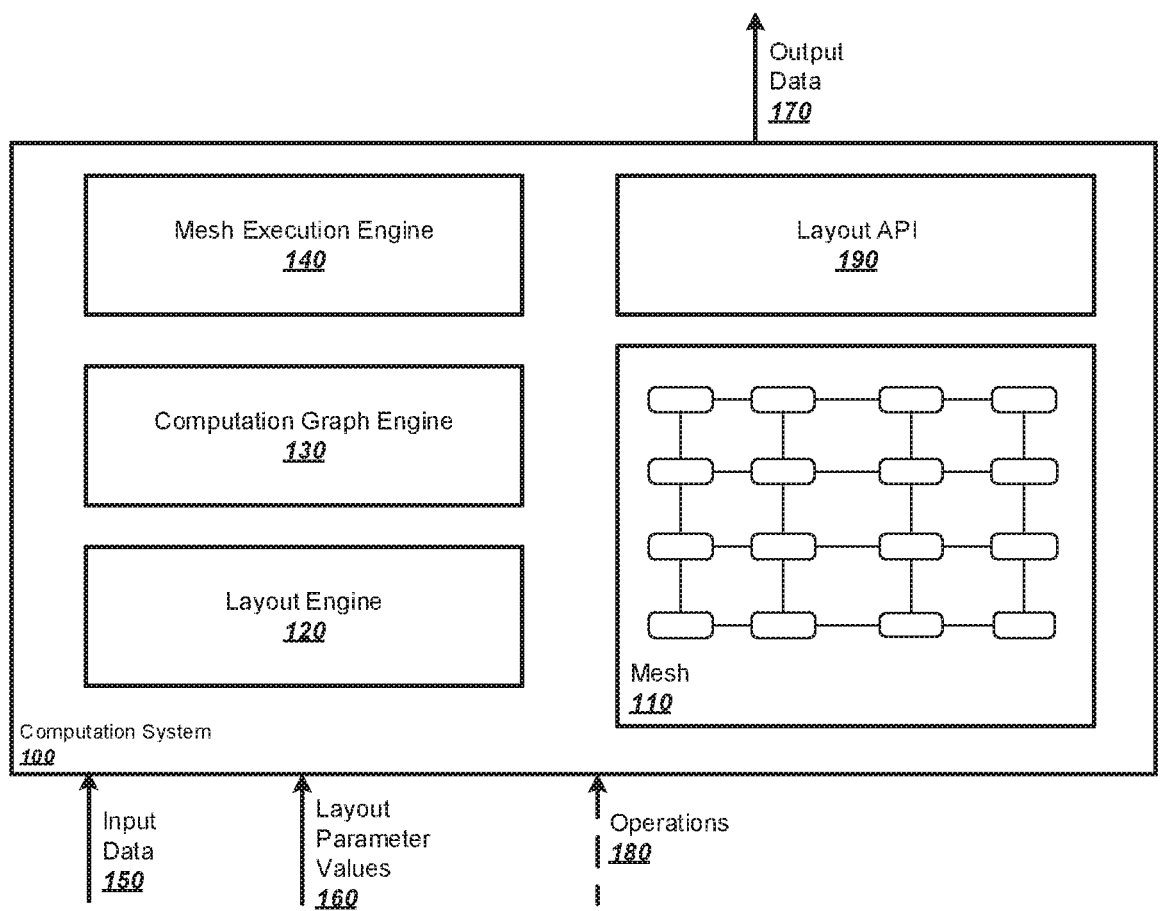
FIG. 1 is a block diagram of a computation system that includes a plurality of computing devices.

FIG. 1 is a block diagram of a computation system 100 that includes a plurality of computing devices that are interconnected to form a mesh 110. The computation system 100 can also include a layout engine 120, a computation graph engine 130, and a mesh execution engine 140. A mesh for purposes of this specification is an n-dimensional array of interconnected computing devices. For example, the mesh 110 is a two-dimensional array of interconnected computing devices. The two-dimensional array of computing devices for the mesh 110 is said to have shape [4, 4], representing a 4×4 array of computing devices.

Different meshes can be defined for the same set of physical devices, and therefore the shape of a mesh does not imply a physical network topology for how the computing devices are interconnected. Rather, the shape of the mesh refers to the number of computing devices represented along each dimension of the n-dimensional array, represented generally as $[k_1, k_2, \ldots k_n]$, with each $k_i$ i≤n representing the length of the i-th dimension in the mesh.

For example, a 512-core tensor processing unit ("TPU") cluster with a 16×16×2 toroidal network interconnect can be represented as: a three-dimensional array with shape [16, 16, 2]; a two-dimensional array with shape [32, 16], or a one-dimensional array with shape [512]. Meshes can be defined for computing devices having different types of processing units, for example central processing units (CPUs), graphics processing units (GPUs), and TPUs.

Optionally, the computation system 100 can also receive data specifying a number of operations 180. In some implementations, the computation system 100 is configured to execute the operations 180 using the computing devices of the mesh 110 and on the input data 150.

In some implementations, the computation system 100 is not configured to receive data specifying a number of operations 180. In those implementations, the computation system 100 is configured to execute a number of predetermined operations using the computing devices of the mesh 110.

As described in more detail, below, the computation system 100 processes the input data 150 according to one or more parallelism techniques specified by the layout parameter values 160, and generates output data 170 corresponding to the processed input data.

The mesh execution engine 140 can receive a layout specifying how tensors and operations should be distributed across the mesh 110. A tensor is a multi-dimensional array of numeric or other values, e.g., strings, having a specific order that corresponds to the dimensionality of the array. For example, a scalar value is a $0^{th}$-order tensor, a vector of numeric values is a $1^{st}$-order tensor, and a matrix of values is a $2^{nd}$-order tensor.

As described below, the layout engine 120 can generate a layout according to the layout parameter values 160 provided to the computation system 100. The mesh execution engine 140 can receive and assign tensor data associated with the input data 150, parameter values for different operations, e.g., weights for a neural network, and can assign the data and operations according to the layout. Layouts generated by the layout engine 120 are collectively referred to as "specification data," because a respective layout for a tensor specifies how the mesh execution engine 140 will distribute, or "lay-out," the tensor across the mesh 110.

Depending on the layout, the mesh execution engine 140 can be configured to implement different parallelism techniques for processing the input data 150 on the computing devices of the mesh 110. For example, the layout engine 120 can generate and send layouts to the mesh execution engine 140 that distribute dimensions of respective tensors and operations to different computing devices, to implement data parallelism. Data parallelism refers to a class of techniques in which input data is divided and distributed across multiple computing devices, but each computing device performs the same operations on different data.

In some implementations, the layout engine 120 can generate and send layouts to the mesh execution engine 140 that in turn distributes respective tensors and operations to implement model parallelism. In these implementations, the operations executed on the mesh 110 are operations for processing the input data 140 through a machine learning model. Model parallelism refers to a class of techniques in which input data is replicated across each of multiple computing devices, with each computing device executing different operations of a machine learning model on copies of the same data.

Therefore, in a data parallelism implementation, data is divided and distributed across computing devices in the mesh 110; and in a model parallelism implementation, operations are divided and distributed across the computing devices. In some implementations, the layout engine 120 can generate and send layouts that causes the mesh execution engine 140 to distribute respective tensors and operations to implement both data and model parallelism.

Turning to formal details and definitions for layouts generated by the layout engine 120, a tensor is said to be "laid-out" on a mesh of computing devices when the mesh execution engine 140 assigns one slice of the tensor to each computing device according to a particular layout. A slice of a tensor is a sub-tensor of the tensor, and can be the tensor itself. Each slice of a tensor assigned to a respective computing device need not be unique, as described below, with examples. For instance, a tensor can be sliced into a number of slices, and one particular slice can be laid-out out on each computing device in the mesh 110.

The mesh execution engine 140 can slice a tensor along one or more dimensions. To be sliced along a dimension means that the tensor is divided into sub-tensors along the dimension. For example, consider a two-dimensional tensor with dimension 0 running horizontally across the tensor, and with dimension 1 running vertically across the tensor. If the tensor is sliced along dimension 0, then the slices will be sub-tensors having values that span horizontally across the tensor. Similarly, if the tensor is sliced along dimension 1, then the sub-tensors have values that span vertically across the tensor.

In general, a tensor and a mesh can have respective arbitrary numbers of dimensions, and a tensor can be sliced across any tensor-dimension and laid-out across any mesh-dimension. In this specification, a dimension of the tensor will be referred to as a tensor-dimension, and a dimension of the mesh will be referred to as a mesh-dimension.

The number of slices a tensor is sliced into depends on the number of computing devices in the mesh-dimension the tensor is being laid-out over. For example, if the mesh is a two-dimensional array of computing devices with two computing devices along a dimension, then if a tensor is laid-out over the dimension, the computation system 100 can slice the tensor into two equal-sized sub-tensors. Similarly, if the mesh was a two-dimensional array of computing devices with six computing devices along a dimension, then the computation system 100 can slice the tensor into six equal-sized sub-tensors.

In some implementations, the mesh execution engine 140 can slice and assign respective slices of a tensor that are not of equal shape. For the purposes of this specification and unless indicated otherwise, when a tensor is sliced into multiple slices, each slice is of the same shape.

Up to this point, a layout has been referred to generally as specifying a format for how tensors and operations are assigned by the mesh execution engine 140 across the computing devices of the mesh 110. More specifically, the layout engine 120 can generate separate layouts for respective tensors, e.g., a tensor representing the input data 150, the output data 170, or any intermediate input and output data generated by processing the operations assigned to the mesh 110.

The layout engine 120 can also generate a separate layout for operations to be processed on the computing devices of the mesh 110. For example, an operation can be represented by one or more weight values stored in a corresponding weight tensor. Each of the computing devices can be configured to execute an operation, e.g., matrix multiplication, by multiplying all or part of an input tensor with all or part of a weight tensor. By specifying a layout for the weight tensor, operations can be distributed across computing devices of a mesh in the same manner that tensors storing input or output data are distributed.

Formally, a layout is an injective partial map from a tensor-dimension of a k-dimensional tensor, to a mesh-dimension of an n-dimensional mesh. The layout defines which dimensions of the tensor are split over which dimensions of the mesh. A layout can be legal or illegal. A layout is illegal if the mesh execution engine 140 causes some slices of the tensor to be lost when the engine lays the tensor out on the mesh 110, according to the layout. Otherwise, the layout is said to be a legal layout.

A layout of an n-dimensional tensor laid-out on a k-dimensional mesh can be represented as an n-tuple: $<d_0, d_1, d_2, \ldots d_n>$, where each $d_i$ is either an empty identifier (represented as Ø) or some integer-valued identifier between 0 and k. The identifier of each $d_i$ represents along which mesh-dimension the tensor-dimension i is laid-out on. If $d_i$ is empty, i.e., is equal to Ø, then the tensor is not laid-out at tensor-dimension i, and instead the values stored by the tensor along dimension i are replicated across each computing device.

For example, a layout of $<1, 0, Ø>$ for a three-dimensional tensor laid-out across a three-dimensional mesh represents that:
  The tensor is sliced along tensor-dimension 0 and each computing device along mesh-dimension 1 is assigned a respective slice;
  The tensor is sliced along tensor-dimension 1 and each computing device along mesh-dimension 0 is assigned a respective slice; and
  The tensor is not sliced along tensor-dimension 2, indicated by the empty identifier Ø. Instead, the tensor is replicated in its entirety across mesh-dimension 2.

FIGS. 2A-D show example layouts for a two-dimensional tensor laid-out on a two-dimensional mesh. In these examples, each value in the two-dimensional tensor represents a respective pixel of an image 210, and respective dimensions of the tensor and the mesh are indexed starting with dimension 0. Dimension 0 is the "horizontal" dimension, and dimension 1 is the "vertical" dimension of the mesh in these examples.

Figure 2A:
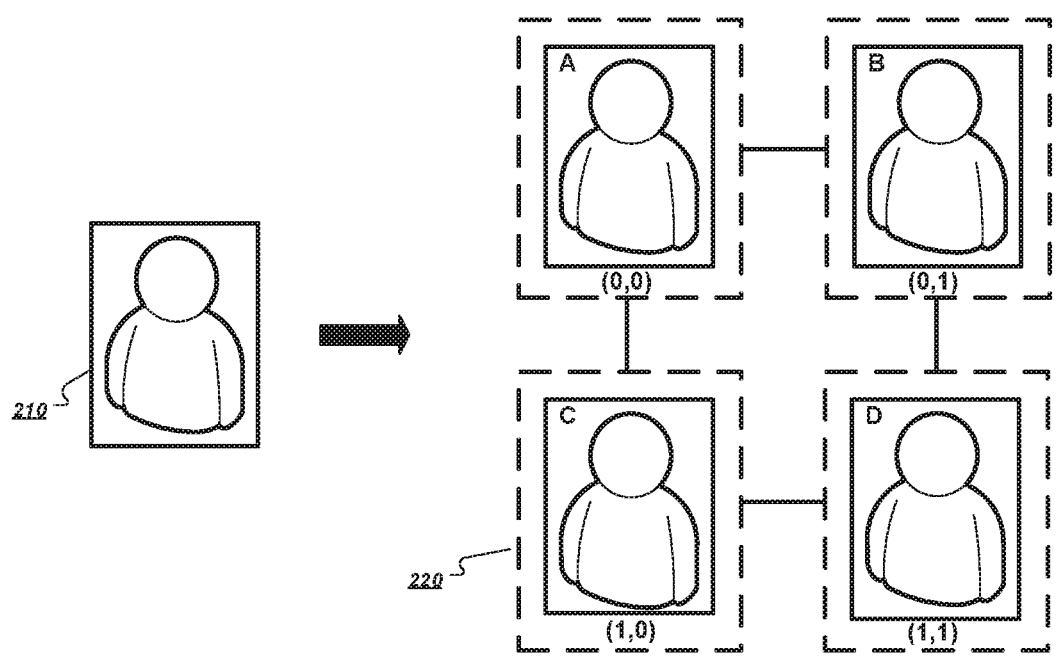
FIGS. 2A-D show example layouts for a two-dimensional tensor laid-out on a two-dimensional mesh.

FIG. 2A shows a tensor laid-out on a mesh 220 of four computing devices A-D, according to an empty layout 230. An empty layout replicates the full tensor and is represented by the two-tuple $<Ø, Ø>$.

Figure 2B:
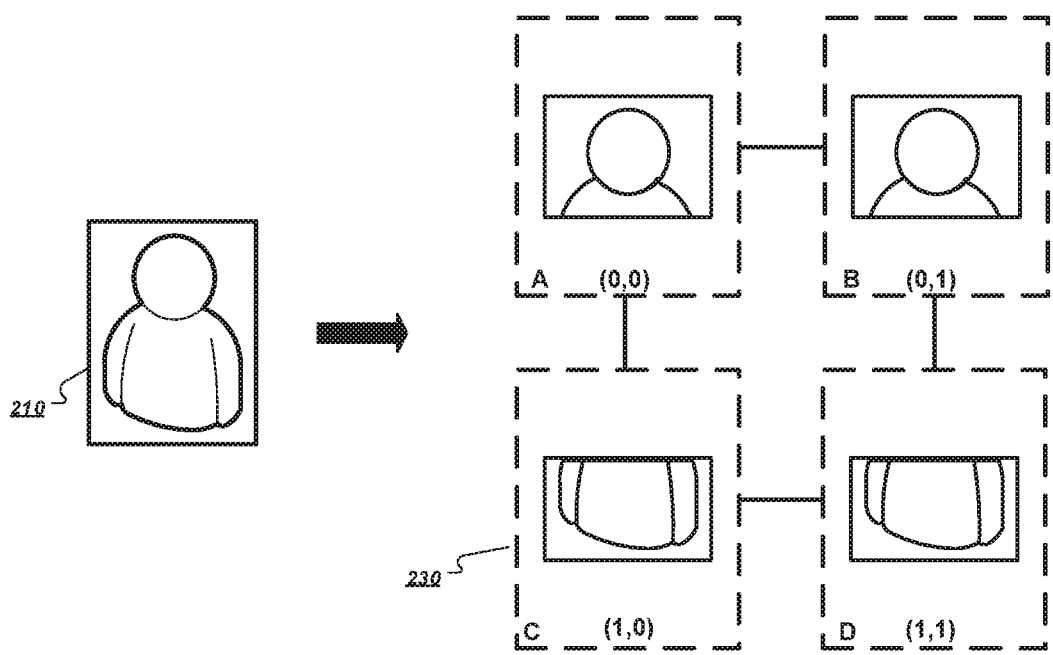

FIG. 2B shows a tensor laid-out on the mesh 220 of four computing devices A-D with the tensor sliced along tensor-dimension 0 and the slices laid-out over mesh-dimension 0. The tensor is not sliced and laid-out across mesh-dimension 1. The two-tuple representing this layout is $<1, Ø>$.

Figure 2C:
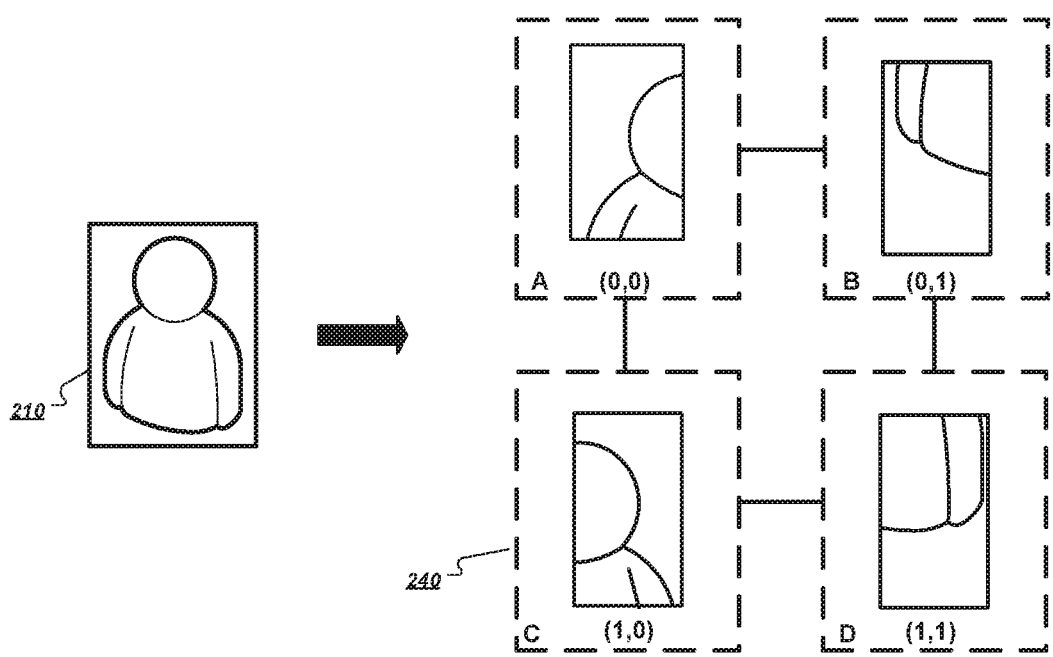

FIG. 2C shows a tensor laid-out on the mesh 220 of four computing devices A-D with the tensor sliced along tensor-dimension 0 and the slices laid-out over mesh-dimension 0. The tensor is also sliced along tensor-dimension 1 with the slices laid-out over mesh-dimension 1. The layout shown in FIG. 2C is represented as $<0, 1>$.

Figure 2D:
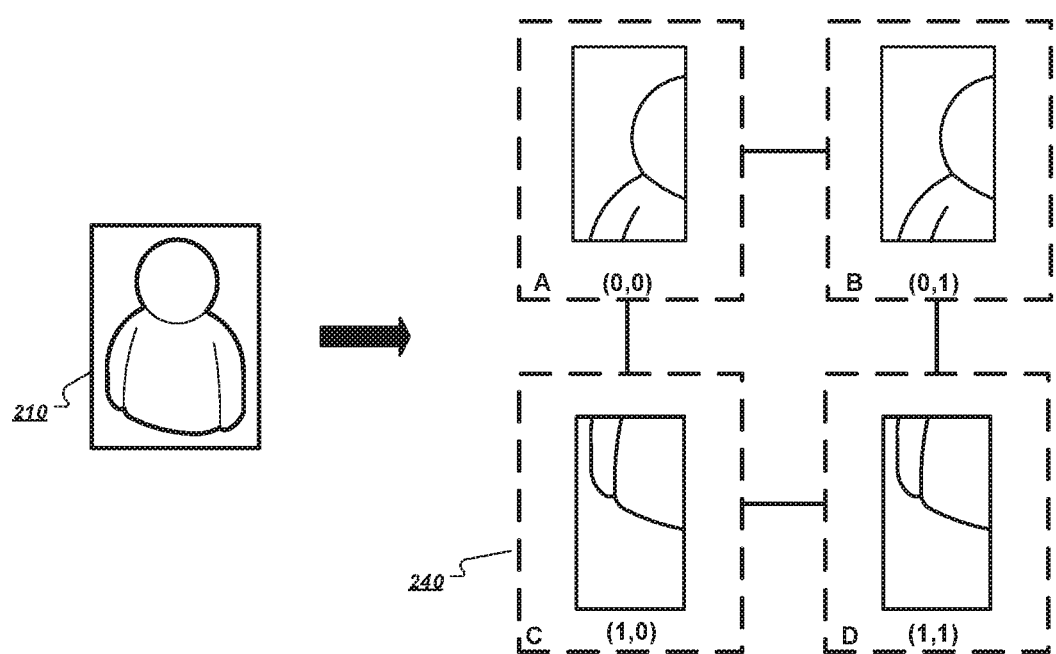

FIG. 2D shows a tensor laid-out on the mesh 220 of four computing devices A-D with the tensor sliced along tensor-dimension 0 and the slices laid-out over mesh-dimension 0. The tensor is again sliced along tensor-dimension 0 but the slices are laid-out over mesh-dimension 1. As shown in FIG. 2D, the right-hand side of the image 210 is lost after the tensor is laid-out across the mesh. Therefore, the layout $<0, 0>$, is an illegal layout. The computation system 100 can be configured to receive a layout and a tensor, and assign laid-out tensors to the mesh 120 according to the layout.

The computation system 100 can be configured to receive a respective n-tuple of identifiers $<d_0, d_1, d_2, \ldots d_n>$ for each tensor in the input data 150, as part of the layout parameter values 160. Then, the mesh execution engine 140 can lay-out each tensor according to the received respective n-tuple.

In some implementations, the computation system 100 is configured to receive an identifier identifying a parallelism technique to implement, e.g., data parallelism, model parallelism, or both. In those implementations, the layout engine 120 can generate a respective layout for each tensor in the input data 150, consistent with the parallelism technique identified by the identifier. As a result, a user specifying a parallelism technique can do so without specifically providing parameter values for layouts corresponding to the parallelism technique.

In some implementations, the computation system 100 is configured to receive a combination of layout parameter values 160 and one or more identifiers specifying a parallelism technique to implement. For example, a user can provide to the computation system 100 an identifier specifying that the system should process the input data 150 by implementing a data parallelism technique. In addition, the user can provide layout parameter values corresponding to how tensors of the input data 150 are to be distributed across the mesh 110. In this way, the user can exercise more control over how the mesh execution engine 140 assigns data and operations to each computing device.

The computation system 100 can be configured to present to the user, e.g., on a display of a user device, a current layout for a tensor, e.g., represented by an n-tuple of identifiers. The user, through a user interface displayed on the user device, can modify values of the n-tuple, which the computation system 100 can later receive and implement. The computation system 100 can be configured to first identify whether the layout as modified by the user is legal or illegal, and notify the user if the user is attempting to provide the computation system with an illegal layout.

In addition, the mesh execution engine 140 can be configured to perform communication primitive operations that cause computing devices in the mesh 110 to communicate with one another. For example, after the computing devices perform respective device-local operations assigned by the mesh execution engine 140, e.g., by distributing a tensor storing weights representing a neural network operation, each computing device generates a respective output that the mesh execution engine 140 can combine to generate the output data 170, by executing communication primitive operations between the computing devices of the mesh 110.

As another example, after the mesh execution engine 140 assigns sub-tensors of an input tensor to different computing devices across the mesh 110, the mesh execution engine 140 can execute communication operation primitives to combine output sub-tensors corresponding to assigned input sub-tensors, to form the output data 180 representing an output for the input data 150.

The computation system can implement a layout API 190 ("Application Program Interface") that defines a number of functions related to specifying the layout for a tensor and for assigning and executing operations on the mesh 110. For example, the layout API 190 can include functions that can be invoked with appropriate values in the layout parameter values 160, that when executed by the computation system 100, cause the computation system 100 to generate layouts according to the arguments provided. The arguments can specify, for example, whether the generated layouts should implement data parallelism, model parallelism, or both.

As another example, the layout API 190 can implement functions that, when invoked with appropriate input parameter values, cause the computation system 100 to modify the shape of the mesh 110 according to the arguments. As another example, the layout API 190 can implement functions for specifying a machine learning model to be executed on the mesh 110.

The layout API 190 can also implement a number of functions relevant to distributed programming and assigning data and operations to different computing devices in the mesh 110. For example, the layout API 190 can implement functions specified in MPI ("Message Passing Interface").

Each computing device of the mesh 110 of the computation system 100 can implement a number of communication primitive operations for communicating output tensors computed at a computing device, to other computing devices in the mesh 110. For example, the computation system 100 can implement a slice-wise application of a function F across multiple computing devices in the mesh 110. A slice-wise application means that operations corresponding to the function F can be assigned to each of the multiple computing devices, and each computing device is configured to execute the function F on a respective assigned tensor-slice.

The computation system 100 can also be configured to handle device-local operations assigned to a computing device in the mesh 110 that results in an output tensor of a different shape than a corresponding input tensor.

If the input tensor is laid-out along the reduced-out dimension j, then the system 100 can be configured to execute an $Allreduce_j$ operation to reduce each tensor-slice along the dimension j. In some implementations, this is analogous to a grouped Allreduce as implemented by MPI. Allreduce refers to operations for performing a reduction of all output values generated by each computing device in the mesh 110, and broadcasting the reduction to each computing device. The computation system 100 can implement the $Allreduce_j$ operation by first partitioning the computing devices of the mesh 110 into groups, such that each computing device in the group has coordinates that differ only in mesh-dimension j, i.e., the reduced-out dimension. Then, tensors assigned to each computing device and for each group can be summed or otherwise reduced and the resulting reduced value can be assigned to each computing device in the group.

If the input tensor is not laid-out along the reduce-out dimension j, then the system 100 can execute a slice-wise reduction with no communication across the mesh 110.

The computation system 100 can also be configured to broadcast tensor-slices, which in this specification refers to inserting one or more new dimensions into a tensor, and duplicating values along those dimensions. In addition, besides implementing matrix multiplication, the computation system 100 can be configured to implement other functions from pre-written libraries, such as TensorFlow.

The computation system 100 can also be configured to convert a laid-out tensor from one layout to another. This can be useful for quickly modifying layouts to implement different parallelization techniques. Additional slices of a tensor can be performed by each computing device as a local operation, and network communication using a primitive like Allreduce is not necessary. On the other hand, "un-slicing" a dimension is implemented as an Allgather operation, e.g., Allgather as defined in MPI. Allgather refers to operations for gathering all of the output values for each computing device in the mesh 110, and broadcasting the gathered output values to each computing device.

As described above with reference to FIG. 1, these and other functions can be implemented through the layout API 190. The specification data can include one or more invoked functions defining how the computation system 100 and the computing devices of the mesh 110 should communicate intermediate tensor outputs amongst one-another.

The computation system 100 can augment computation graphs representing a set of inter-connected operations, and specify a computation layout for the graph. A computation graph is a graph that represents a sequence of related operations. For example, a computation graph can represent operations for processing an input through a neural network. Each operation can receive zero or more inputs, and can generate an output. The inputs and output can be, for example, a tensor.

A plurality of operations, e.g., operations that the mesh execution engine 140 can distribute across the computing devices, can be represented as a directed acyclic computation graph having a plurality of nodes and one or more edges. Each node of the computation graph represents a respective operation of the plurality of operations. One node of the computation graph is designated as the final node f. The output of the operation represented by the final node f is the final output of the operations represented by the computation graph.

For any two nodes u and v in the computation graph, an edge (u, v) is a directed edge and represents a data dependency from u to v. A data dependency from u to v means the operation represented by node u generates an output that is input to the operation represented by node v. Therefore, the node-u operation must be performed before performing the node-v operation. There are no circular data dependencies in the computation graph, e.g., an edge (u, v) and an edge (v, u), because the computation graph is acyclic.

A laid-out computation graph is a computation graph representing operations that receive input and generate outputs as laid-out tensors. The computation system 100 can generate a laid-out computation graph from a computation graph by assigning a layout to each input and output tensor in the graph. In this specification, operations for a laid-out computation graph are called laid-out operations, and the layouts for respective input and output tensors for a laid-out operation are called operation layouts. Collectively, the operation layouts corresponding to all of the laid-out operations for a laid-out computation graph are referred to as a computation layout.

The computation system 100 can also receive a regular computation graph and generate a laid-out computation graph by the layout engine 120. Then, the mesh execution engine 140 can receive the laid-out computation graph and assign laid-out tensors and laid-out operations to computing devices in the mesh 110. Depending on the layout parameter values 160, the layout engine 120 can generate a computation layout for the computation graph implementing one or more parallelization techniques.

For example, the computation system 100 can receive a computation graph representing a neural network having: an input layer, a hidden layer with nonlinear activation function A, and an output layer. The neural network also includes two weight tensors, $W_1$ and $W_2$, storing values representing weights of the input and hidden layer of the neural network, respectively. Together, the operations to process X to obtain Y from the neural network can be represented as:

$$Y \leftarrow A(XW_1)W_2 \qquad \text{Equation 1}$$

Assume in this example that the mesh 110 of the computation system 100 is a one-dimensional mesh of computing devices. The computation system 100 can generate a laid-out computation graph implementing data-parallelism on the example neural network. The operation layouts for the input and output tensors of each operation can be represented as:

$$Y^{<0,\emptyset>} \leftarrow A(X^{<0,\emptyset>} W_1^{<\emptyset,\emptyset>})^{<0,\emptyset>} W_2^{<\emptyset,\emptyset>} \qquad \text{Equation 2}$$

The layout for the output tensor Y, the input tensor X, and the activations generated by executing the activation function $A(XW_1)$ is $<0, \emptyset>$ and specifies that each tensor is sliced along tensor-dimension 0 and laid-out across the mesh along mesh-dimension 0. The layout for the weight tensors $W_1$ and $W_2$ is $<\emptyset, \emptyset>$ and specifies that the weight tensors are not sliced but rather completely replicated across each computing device. Together, these operation layouts represent a general computation layout for implementing data parallelism. The computation system 100 can assign a respective tensor-slice to each computing device according to the computation layout, and execute the laid-out computation graph on the mesh 120, because the weight tensors are fully replicated but the data is split and distributed and operated on in parallel.

Equation 3, below, represents a computation layout for the computation graph for the neural network shown in Equation 1, implementing model parallelism:

$$Y^{<\emptyset,\emptyset>} \leftarrow A(X^{<\emptyset,\emptyset>} W_1^{<0,\emptyset>})^{<\emptyset,\emptyset>} W_2^{<0,\emptyset>} \qquad \text{Equation 3}$$

In Equation 3, note that tensors X and Y, corresponding to the input and output of the neural network, respectively, are laid-out according to the empty layout $<\emptyset, \emptyset>$, while the weight tensors $W_1$ and $W_2$ are laid-out across the mesh according to the lay out $<0, \emptyset>$. Because the input and output data are replicated but the weights of the weight tensors are sliced and distributed across the mesh, Equation 3 represents a model parallelism implementation on the neural network.

Equation 4, below, represents a computation layout for the computation graph for the neural shown in Equation 1, implementing both data and model parallelism:

$$Y^{<0,\emptyset>} \leftarrow A(X^{<0,\emptyset>} W_1^{<0,\emptyset>})^{<0,\emptyset>} W_2^{<0,\emptyset>} \qquad \text{Equation 4}$$

Equation 4 shows every tensor laid-out across the mesh according to the layout $<0, \emptyset>$. Because all the tensors are sliced and distributed across the mesh, Equation 5 represents both data and model parallelism on the neural network.

The computation system 100 can receive the operations 180 and input data 150, and generate a computation graph. In some implementations, the computation graph engine 130 is configured to receive the input data 150 and the operations 180 and generate a corresponding computation graph. Then, the layout engine 120 can receive and generate a laid-out computation graph from the computation graph, and send the laid-out computation graph to the mesh execution engine 140.

The computation system 100 can be configured to display computation layouts on a display of a user device, and provide an interface for receiving the layout parameter values 160 and the operations 180 from, for example, a user of the computation system 100. For example, the layout API 190 can define one or more functions for receiving, generating, and modifying a computation layout.

In some implementations, the computation system 100 can be configured to generate and output a computation layout corresponding to a computation graph, without executing the computation graph on the mesh 110. The computation layout can then be received as input by a system configured to execute the operations represented by the computation graph, according to the computation layout.

The computation system 100 can generate computation layouts for computation graphs representing a Transformer sequence-to-sequence model. A sequence-to-sequence model is a type of machine learning model that receives an input sequence, e.g., of words in one language, and generates an output sequence from the input sequence, e.g., a translation of the input sequence into another language. A Transformer model includes an Encoder and a Decoder layer, which both include a number of sublayers, including Multi-Head Attention sublayers, Feed-Forward sublayers, and Multi-Head Attention sublayers. A detailed discussion of Transformer models is provided in "Attention Is All You Need," Vaswani, et al., 2017.

The computation system 100 can generate a computation layout for a computation graph of a Transformer model, that when executed by the mesh execution engine 140, causes the computation system 100 to execute the Transformer model implementing model parallelism. As a result, the computation system 100 can rapidly scale up a Transformer model to include billions of parameter values and surpass performance on conventional approaches to these and other types of models.

Figure 3:
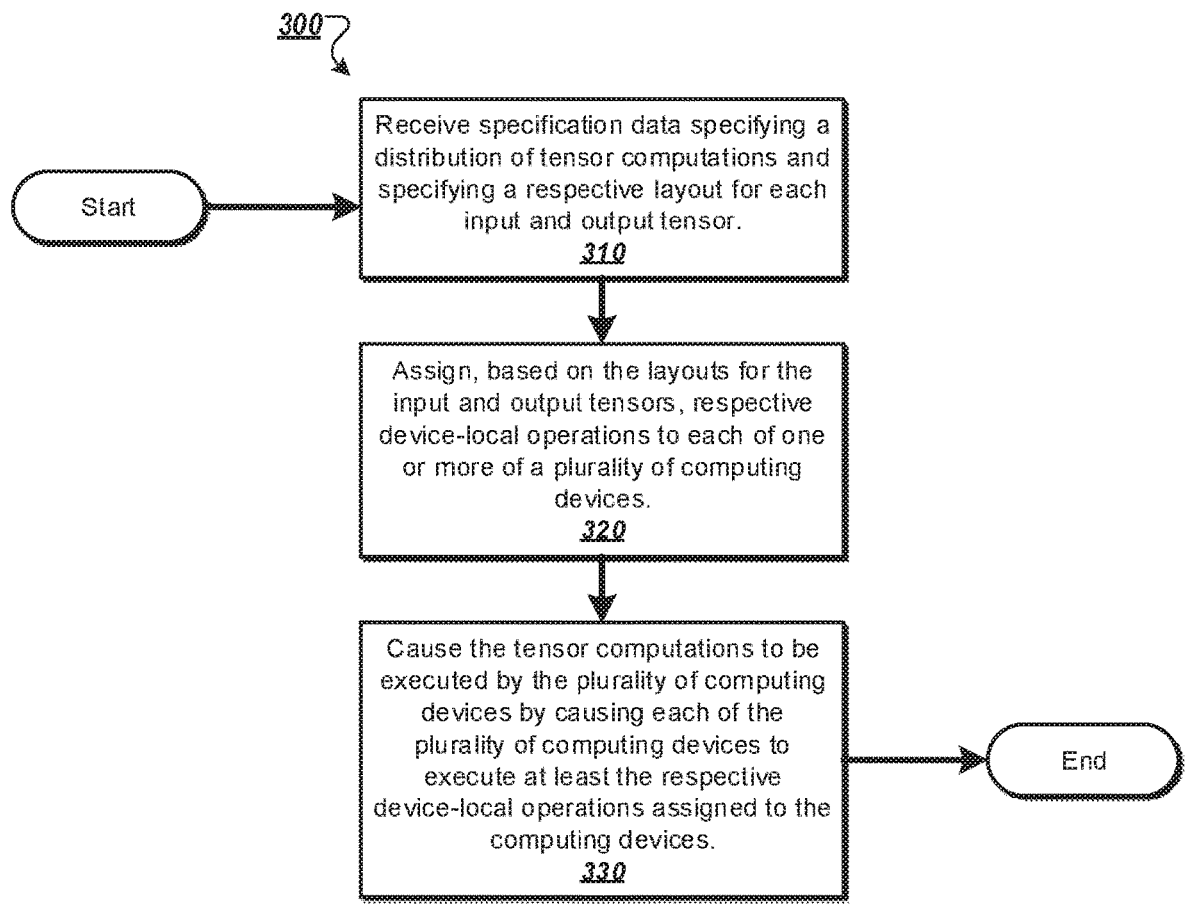
FIG. 3 is a flowchart of an example process for executing operations on a plurality of computing devices according to specification data specifying a distribution of tensor computations.

FIG. 3 is a flowchart of an example process 300 for executing operations on a plurality of computing devices according to specification data specifying a distribution of tensor computations. For convenience, the process 300 will be described as being performed by a system of one or more computers, located in one or more locations, and programmed appropriately in accordance with this specification. For example, a computation system, e.g., the computation system 100 of FIG. 1, appropriately programmed, can perform the process 300.

The computation system receives specification data that specifies a distribution of tensor computations among a plurality of computing devices (step 310). As described above with reference to FIG. 1, the computation system can receive specification data specifying a respective layout for each input and output tensor that assigns each dimension of the input or output tensor to one or more of the plurality of computing devices. Each tensor computation can be represented as one or more operations in a computation graph, as described above. Each operation can receive as input one or more input tensors each having one or more respective input dimensions, and generate as output one or more output tensors each having one or more respective output dimensions. Some operations can both receive input tensors and generate as output the one or more output tensors.

The system assigns, based on the layouts for the input and output tensors, respective device-local operations to each of the plurality of computing devices (step 320). As described above with reference to FIG. 1, the computation system can comprise a mesh execution engine that distributes tensors according to respective layouts for the tensors. Operations can be distributed across the plurality of computing devices by assigning slices of a tensor representing weights to each of one or more of the plurality of devices.

The system causes the tensor computations to be executed by the plurality of computing devices by causing each of the plurality of computing devices to execute at least the respective device-local operations assigned to the computing devices (step 330). As described above with reference to FIG. 1, the mesh execution engine of the computation system can cause the tensor computations to be executed by computing devices of the mesh, consistent with how each tensor is laid-out consistent with a respective layout. As necessary, the system can also execute one or more communication primitives for combining individual outputs generated by executing device-local operations on the computing devices, to generate a combined output that can be an output for the tensor computations or input for another computation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, specialpurpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the implementations of the attached claims and the implementations described above, the following numbered implementations are also innovative:

Implementation 1 is a computer-implemented method comprising, receiving specification data that specifies a distribution of tensor computations among a plurality of computing devices, wherein each tensor computation (i) is defined as receiving, as input, one or more respective input tensors each having one or more respective input dimensions, (ii) is defined as generating, as output, one or more respective output tensors each having one or more respective output dimensions, or both, and wherein the specification data specifies a respective layout for each input and output tensor that assigns each dimension of the input or output tensor to one or more of the plurality of computing devices; assigning, based on the layouts for the input and output tensors, respective device-local operations to each of the plurality of computing devices; and causing the tensor computations to be executed by the plurality of computing devices by causing each of the plurality of computing devices to execute at least the respective-device local operations assigned to the computing devices.

Implementation 2 is a method comprising: receiving specification data that specifies a distribution of tensor computations among a plurality of computing devices, wherein each tensor computation (i) receives as input one or more respective input tensors each having one or more respective input dimensions, (ii) generates as output one or more respective output tensors each having one or more respective output dimensions, or both, and wherein the specification data specifies a respective layout for each input and output tensor that assigns each dimension of the input or output tensor to one or more of the plurality of computing devices; assigning, based on the layouts for the input and output tensors, respective device-local operations to each of the plurality of computing devices; and causing the tensor computations to be executed by the plurality of computing devices by causing each of the plurality of computing devices to execute at least the respective-device local operations assigned to the computing devices.

Implementation 3 is the method of any one of implementations 1 through 2, wherein the tensor computations are operations for training a machine learning model on training data using a machine learning training technique, and wherein the specification data specifies respective layouts for each tensor processed while performing an iteration of the machine learning training technique on a batch of training data.

Implementation 4 is the method of any one of implementations 1 through 3, wherein the tensor computations are represented by a directed graph of nodes connected by directed edges, each node representing a respective tensor computation and each incoming edge to a node representing an input tensor to the tensor computation represented by the node and each outgoing edge from the node representing an output tensor of the tensor represented by the node, and wherein the specification data specifies respective layouts for each of the tensors represented by edges in the directed graph.

Implementation 5 is the method of any one of implementations 1 through 4, wherein, for each input and output tensor, the layout specifies, for each dimension of the tensor, either that (i) the data along the dimension is replicated across all of the computing devices in the plurality of computing devices or that (ii) the data along the dimension is split among at least two of the plurality of processors.

Implementation 6 is the method of any one of implementations 1 through 5, wherein the plurality of computing devices are arranged into an n-dimensional array, and wherein, for each input and output tensor, the layout specifies, for each dimension of the tensor, either that (i) the data along the dimension is replicated across all of the computing devices in the plurality of devices or that (ii) the data along the dimension is split between the computing devices along one of the dimensions of the n-dimensional array.

Implementation 7 is the method of any one of implementations 1 through 6, wherein a shape of each of input and output tensor is referred to as a tuple of shape symbols, and wherein the specification data identifies, for at least one of the shape symbols, a mapping from a shape symbol to an identifier for one of n dimensions.

Implementation 8 is the method of any one of implementations 1 through 7, wherein assigning, based on the assignments of the n dimensions of the input and output tensors, respective device-local operations to the plurality of computing devices, for each tensor computation: identifying, for each input tensor to the tensor computation and for each device, a slice of the input tensor that is assigned to the device by the specification data; and assigning, to each device, a slice-wise instance of the tensor computation that applies the tensor computation to the slices of the input tensors that are assigned to the device.

Implementation 9 is them method of any one of implementations 1 through 8, wherein assigning, based on the assignments of the dimensions of the input and output tensors, respective device-local operations to the plurality of computing devices comprises: determining, for a first tensor computation, that communication between devices is required for slice-wise instances of the first tensor computation to generate a correct output for the first tensor computation, and assigning, to the plurality of devices, one or more communication operations that cause communication between devices to combine outputs generated by the slice-wise instances of the first tensor computation.

Implementation 10 is a system comprising: one or more computers and one or more storage devices storing instructions that are operable, when executed by the one or more computers, to cause the one or more computers to perform the method of any one of implementations 1 through 9.

Embodiment 11 is a computer storage medium encoded with a computer program, the program comprising instructions that are operable, when executed by data processing apparatus, to cause the data processing apparatus to perform the method of any one of implementations 1 through 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving specification data that specifies a distribution of tensor computations among a plurality of computing devices,
wherein each tensor computation (i) is defined as receiving, as input, one or more respective input tensors each having one or more respective input dimensions, (ii) is defined as generating, as output, one or more respective output tensors each having one or more respective output dimensions, or (iii) is defined as both receiving, as input, one or more respective input tensors each having one or more respective input dimensions and generating, as output, one or more respective output tensors each having one or more respective output dimensions, and
wherein the specification data specifies a respective layout for each input and output tensor that assigns each dimension of the input or output tensor to one or more of the plurality of computing devices;
assigning, based on the layouts for the input and output tensors, respective device-local operations to each of the plurality of computing devices, comprising determining that the layout, if assigned, does not cause data to be lost for a respective tensor corresponding to the layout; and causing the tensor computations to be executed by the plurality of computing devices by causing each of the plurality of computing devices to execute at least the respective-device local operations assigned to the computing devices.

2. The method of claim 1, wherein the tensor computations are operations for training a machine learning model on training data using a machine learning training technique, and wherein the specification data specifies respective layouts for each tensor processed while performing an iteration of the machine learning training technique on a batch of training data.

3. The method of claim 1, wherein the tensor computations are represented by a directed graph of nodes connected by directed edges, each node representing a respective tensor computation and each incoming edge to a node representing an input tensor to the tensor computation represented by the node and each outgoing edge from the node representing an output tensor of the tensor computation represented by the node, and wherein the specification data specifies respective layouts for each of the tensors represented by edges in the directed graph.

4. The method of claim 1, wherein, for each input and output tensor, the layout specifies, for each dimension of the tensor, either that (i) the data along the dimension is replicated across all of the computing devices in the plurality of computing devices or that (ii) the data along the dimension is split among at least two of the plurality of computing devices.

5. The method of claim 4, wherein the plurality of computing devices are arranged into an n-dimensional array, and wherein, for each input and output tensor, the layout specifies, for each dimension of the tensor, either that (i) the data along the dimension is replicated across all of the computing devices in the plurality of devices or that (ii) the data along the dimension is split between the computing devices along one of the dimensions of the n-dimensional array.

6. The method of claim 5, wherein a shape of each of input and output tensor is referred to as a tuple of shape symbols, and wherein the specification data identifies, for at least one of the shape symbols, a mapping from a shape symbol to an identifier for one of n dimensions.

7. The method of claim 1, wherein assigning respective device-local operations to the plurality of computing devices further comprises, for each tensor computation:

identifying, for each input tensor to the tensor computation and for each device, a slice of the input tensor that is assigned to the device by the specification data; and assigning, to each device, a slice-wise instance of the tensor computation that applies the tensor computation to the slices of the input tensors that are assigned to the device.

8. The method of claim 1, wherein assigning respective device-local operations to the plurality of computing devices comprises:

determining, for a first tensor computation, that communication between devices is required for slice-wise instances of the first tensor computation to generate a correct output for the first tensor computation, and assigning, to the plurality of devices, one or more communication operations that cause communication between devices to combine outputs generated by the slice-wise instances of the first tensor computation.

9. The method of claim 8, wherein assigning communication operations that cause communication between devices to combine outputs generated by the slice-wise instances of the operations comprises inserting an Allreduce operation.

10. The method of claim 1, wherein the specification data is specified by a user, and wherein the method further comprises:

determining that a first layout of the layouts, if assigned, causes data to be lost for a respective tensor corresponding to the first layout, and in response, notifying the user that the first layout is an illegal layout.

11. A system comprising:

one or more computers and one or more storage devices on which are stored instructions that are operable, when executed by the one or more computers, to cause the one or more computers to perform operations comprising:

receiving specification data that specifies a distribution of tensor computations among a plurality of computing devices, wherein each tensor computation (i) is defined as receiving, as input, one or more respective input tensors each having one or more respective input dimensions, (ii) is defined as generating, as output, one or more respective output tensors each having one or more respective output dimensions, or (iii) is defined as both receiving, as input, one or more respective input tensors each having one or more respective input dimensions and generating, as output, one or more respective output tensors each having one or more respective output dimensions; and wherein the specification data specifies a respective layout for each input and output tensor that assigns each dimension of the input or output tensor to one or more of the plurality of computing devices;

assigning, based on the layouts for the input and output tensors, respective device-local operations to each of the plurality of computing devices, comprising determining that the layout, if assigned, does not cause data to be lost for a respective tensor corresponding to the layout; and causing the tensor computations to be executed by the plurality of computing devices by causing each of the plurality of computing devices to execute at least the respective-device local operations assigned to the computing devices.

12. The system of claim 11, wherein the tensor computations are operations for training a machine learning model on training data using a machine learning training technique, and wherein the specification data specifies respective layouts for each tensor processed while performing an iteration of the machine learning training technique on a batch of training data.

13. The system of claim 11, wherein the tensor computations are represented by a directed graph of nodes connected by directed edges, each node representing a respective tensor computation and each incoming edge to a node representing an input tensor to the tensor computation represented by the node and each outgoing edge from the node representing an output tensor of the tensor computation represented by the node, and wherein the specification data specifies respective layouts for each of the tensors represented by edges in the directed graph.

14. The system of claim 11, wherein, for each input and output tensor, the layout specifies, for each dimension of the tensor, either that (i) the data along the dimension is replicated across all of the computing devices in the plurality of computing devices or that (ii) the data along the dimension is split among at least two of the plurality of computing devices.

15. The system of claim 14, wherein the plurality of computing devices are arranged into an n-dimensional array, and wherein, for each input and output tensor, the layout specifies, for each dimension of the tensor, either that (i) the data along the dimension is replicated across all of the computing devices in the plurality of devices or that (ii) the data along the dimension is split between the computing devices along one of the dimensions of the n-dimensional array.

16. The system of claim 15, wherein a shape of each of input and output tensor is referred to as a tuple of shape symbols, and wherein the specification data identifies, for at least one of the shape symbols, a mapping from a shape symbol to an identifier for one of n dimensions.

17. The system of claim 11, wherein assigning respective device-local operations to the plurality of computing devices further comprises, for each tensor computation:
    identifying, for each input tensor to the tensor computation and for each device, a slice of the input tensor that is assigned to the device by the specification data; and
    assigning, to each device, a slice-wise instance of the tensor computation that applies the tensor computation to the slices of the input tensors that are assigned to the device.

18. The system of claim 11, wherein assigning, based on the assignments of the dimensions of the input and output tensors, respective device-local operations to the plurality of computing devices comprises:
    determining, for a first tensor computation, that communication between devices is required for slice-wise instances of the first tensor computation to generate a correct output for the first tensor computation, and
    assigning, to the plurality of devices, one or more communication operations that cause communication between devices to combine outputs generated by the slice-wise instances of the first tensor computation.

19. The system of claim 18, wherein assigning communication operations that cause communication between devices to combine outputs generated by the slice-wise instances of the operations comprises inserting an Allreduce operation.

20. One or more non-transitory computer-readable storage media encoded with instructions that, when executed by one or more computers, cause the one or more computers to perform operations comprising:
    receiving specification data that specifies a distribution of tensor computations among a plurality of computing devices,
        wherein each tensor computation (i) is defined as receiving, as input, one or more respective input tensors each having one or more respective input dimensions, (ii) is defined as generating, as output, one or more respective output tensors each having one or more respective output dimensions, or (iii) is defined as both receiving, as input, one or more respective input tensors each having one or more respective input dimensions and generating, as output, one or more respective output tensors each having one or more respective output dimensions, and
        wherein the specification data specifies a respective layout for each input and output tensor that assigns each dimension of the input or output tensor to one or more of the plurality of computing devices;
    assigning, based on the layouts for the input and output tensors, respective device-local operations to each of the plurality of computing devices, comprising determining that the layout, if assigned, does not cause data to be lost for a respective tensor corresponding to the layout; and
    causing the tensor computations to be executed by the plurality of computing devices by causing each of the plurality of computing devices to execute at least the respective-device local operations assigned to the computing devices.

* * * * *